United States Patent [19]

Unno et al.

[11] 3,776,065
[45] Dec. 4, 1973

[54] AUTOMATIC BALANCING APPARATUS FOR A ROTATING BODY

[75] Inventors: Kunihiko Unno, Kariya; Kazuhiro Sugita, Anjo, both of Japan

[73] Assignee: Toyoda Koki Kabushiki Kaisha, Aichi-ken, Japan

[22] Filed: Sept. 14, 1972

[21] Appl. No.: 289,123

[30] Foreign Application Priority Data
Sept. 14, 1971 Japan................................ 46/71576

[52] U.S. Cl..................................... 74/573, 51/169
[51] Int. Cl................................................. F16f 15/10
[58] Field of Search........................ 74/573; 51/169; 64/1 V

[56] References Cited
UNITED STATES PATENTS
3,376,759   4/1968   Held ................................... 74/573
3,407,545   10/1968  Imiolczyk ........................... 51/169

Primary Examiner—Charles J. Myhre
Assistant Examiner—F. D. Shoemaker
Attorney—Norman F. Oblon et al.

[57] ABSTRACT

An automatic balancing apparatus for a rotating body in a machine tool such as, for example, a grinding machine, having two co-axial operating shafts disposed within a spindle which are axially and rotatably movable by a pressure differential in a fluid bearing, due to the existence of an unbalanced condition in the rotating body. A pair of balancing pieces are moved at right angles with respect to each other by the operating shafts so as to compensate for the unbalanced condition in the rotating body.

6 Claims, 5 Drawing Figures

3,776,065

AUTOMATIC BALANCING APPARATUS FOR A ROTATING BODY

BACKGROUND OF THE INVENTION

The present invention relates generally to automatic balancing apparatus and more particularly to automatic balancing apparatus for automatically balancing a rotating body which is mounted upon a machine tool, such as, for example, a grinding machine, when the rotating body is rotated in an unbalanced condition.

As is well known in one type of conventional balancing apparatus, the amplitude of vibration of the rotating body is detected by a vibration transducer while the rotating body to be balanced is being rotated about the predetermined axis. Balancing adjustment is then performed by angularly shifting balancing pieces to appropriate positions, till the vibration due to the unbalanced condition of the rotating body is eliminated. In such balancing apparatus, it is difficult to maintain an accurately balanced condition because vibration of other parts of the machine is unavoidably incurred.

In another type of conventional balancing apparatus, the vibration transducer is provided for detecting the vibration of a rotating spindle by sensing the fluctuation in hydraulic pressure which is created in a detector sleeve by rotation of a spindle eccentric to the center of the detector sleeve, due to the unbalanced condition in the rotating body. The pressure fluctuation is applied to operational chambers which are provided with balancing rollers, to thereby bring the rotating spindle into a balanced condition by adjusting the positions of the balancing rollers. In this balancing apparatus, however, if the unbalanced condition of the rotating body is small, the difference in hydraulic pressure applied to both side surfaces of the balancing rollers is also small. Thus, the balancing rollers may not be moved into the exactly adjusted positions, that is, precise balancing adjustment of the rotating body may not be expected.

SUMMARY OF THE INVENTION

Accordingly, it is an object of the present invention to provide an improved automatically actuated balancing apparatus for balancing a rotating body.

Another object of the present invention is to provide an improved automatic balancing apparatus wherein the balancing pieces are moved in directions opposite to each other into an equilibrium position by a pressure differential created in a fluid bearing, due to the existence of an unbalanced condition in the rotating body.

Still another object of the present invention is to provide an improved automatic balancing apparatus having an improved system which is associated with a vibration detector and a driving device, whereby the system amplifies the pressure differential in the fluid bearing so as to operate the driving device.

The foregoing objectives are achieved according to this invention through the provision of an automatic balancing apparatus for the rotating body of the present invention having two operating shafts arranged within the spindle for axial and rotatable movement in accordance with the action of a driving device which is connected to the fluid bearing of an hydraulic detection means. Amplification of the resulting pressure differential is applied to driving means for operation upon the operating shafts. Movement of the shafts in turn causes the rotational movement of balancing pieces which are consequently moved toward the equilibrium positions at right angles to each other within the spindle. As the result of the balancing operation, the degree of unbalance with regard to the rotating body is eliminated by movement of each of the balancing pieces.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF A PREFERRED EMBODIMENT

Figure 1:
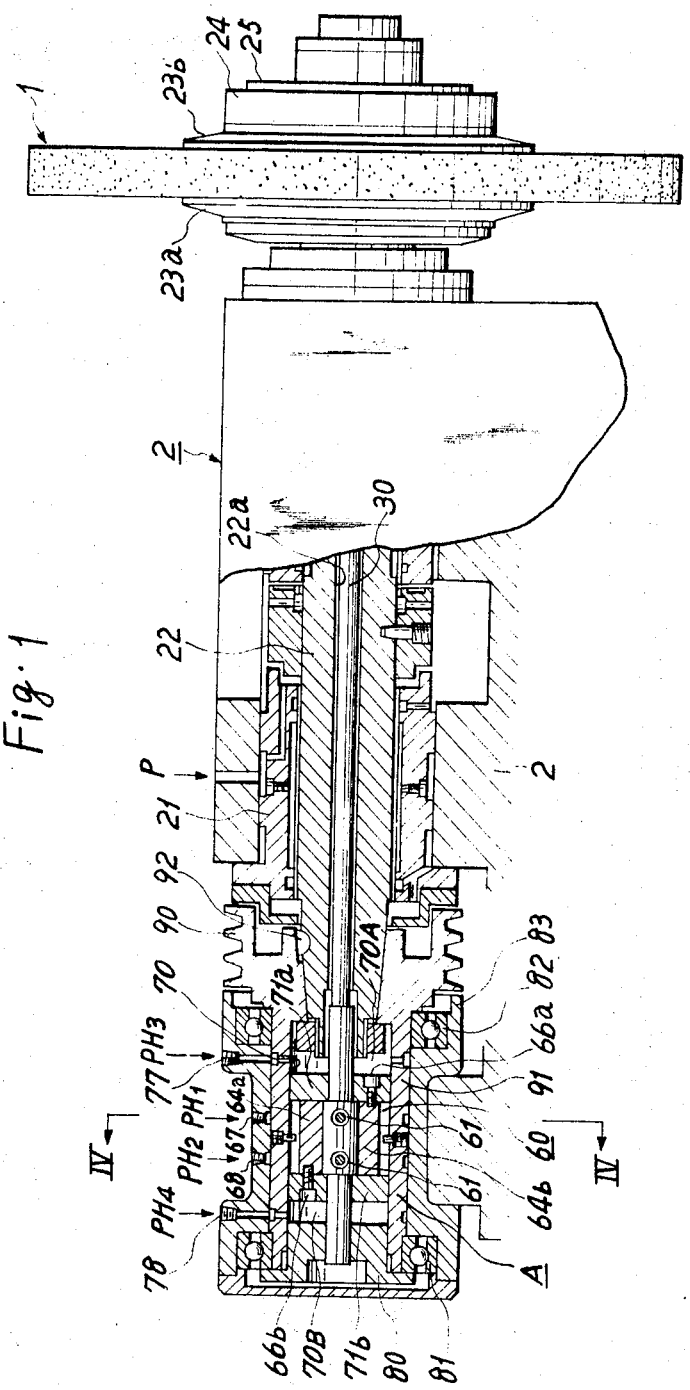
FIG. 1 is a cross-sectional elevation, partly in section, of an automatic balancing apparatus constructed according to the present invention and showing its cooperative parts.
Figure 2:
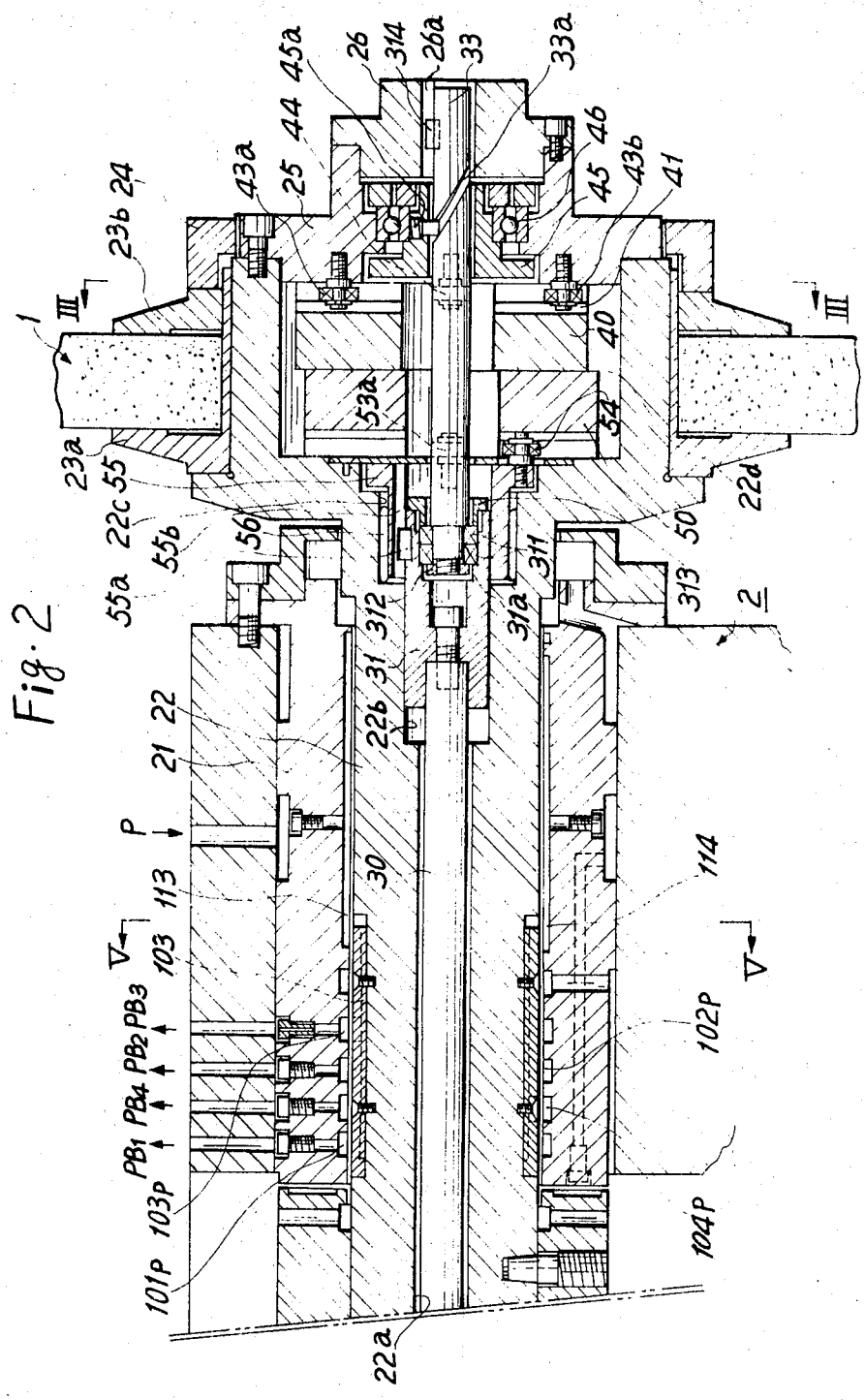
FIG. 2 is a cross-sectional view of the part not shown in cross-section in FIG. 1.

Referring now to the drawings, and more particularly to FIGS. 1 and 2 thereof, a spindle 22 is rotatably mounted within a wheel head 2 through bearing sleeves 21 which are also secured within head 2. An annular, disc-shaped grinding wheel 1 is mounted upon the spindle 22 at the right end thereof through annular wheel sleeves 23a and 23b which are secured thereto by an annular threaded member 24. The threaded member 24 is in turn threadably engaged with the outer periphery of an annular cover plate 25, the cover plate 25 being fixed to the right end of the spindle 22, while an annular guide member 26, which is provided with a centrally located key way 26a, is further fixed to cover plate 25. A primary operating shaft 30 is movably received within a bore 22a which is co-axially provided within the spindle 22, the right end of shaft 30 being fixedly supported by a generally cylindrical connecting member 31. The connecting member 31 is slidably mounted within an enlarged cylindrical bore 22b which is located at the right end of bore 22a. Similarly, the left end of the primary operating shaft 30 is slidably received within a supporting member 80, through a driving device A, as shown in FIG. 1, as will be described in greater detail hereinafter.

A secondary operating shaft 33, which is in co-axial relationship with the primary operating shaft 30, is provided with a helical groove 33a upon its outer periphery near its right end. At its left end, the shaft 33 is introduced into a cylindrical bore 31a of the connecting member 31, and is rotatably journaled therein through an annular bearing 311. However, the left end portion of the rod 33 is prevented from axial movement with respect to the connecting member 31 by means of lock nuts 312 and 313, which are disposed on either side of bearing 311. Similarly, the right end portion of the rod 33 is slidably received within the guiding member 26 in an alignment relationship therewith but is refrained from rotation with respect thereto by a detent key 314 which is engaged with the key way 26a.

Figure 3:
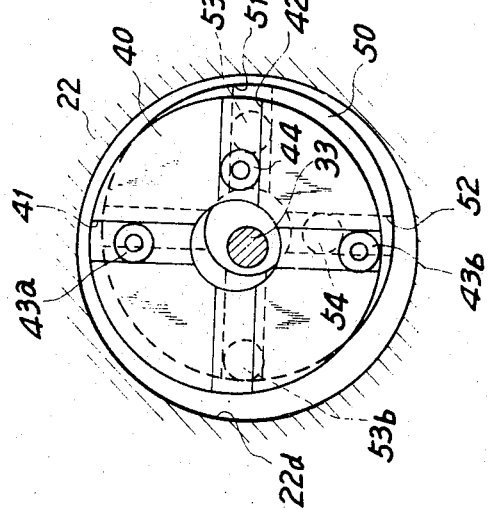
FIG. 3 is a cross-sectional view taken along the line III—III in FIG. 2.

Movably arranged within a cylindrical bore 22d, which is provided at the right end of the spindle 22, is a first, annular, disc-shaped balancing piece 40 provided with slide-way slots 41 and 42 which intersect at right angles with each other (see FIG. 3). A pair of supporting rollers 43a and 43b, rotatably positioned within the slide way 41, are attached to the cover plate 25 at diametrically opposite positions with respect to the axis of the spindle 22. A driving roller 44 is received within the slot 42 of the balancing piece 40 and is rotatably supported upon a rotating member 45. Furthermore, the rotating member 45 is rotatably journaled within the cover plate 25 through means of a ball bearing 46, and is operably rotated by axial movement of the primary and secondary operating shafts 30 and 33, respectively, through co-operation of a guide pin 45a situated within the helical groove 33a.

A second annular, disc-shaped balancing piece 50, which is also arranged within the cylindrical bore 22d, also has slide way slots 51 and 52 perpendicularly located with respect to each other, the slots being located upon the left side surface of piece 50 as seen in FIG. 2. A pair of supporting guide rollers 53a and 53b (see FIG. 3) are rotatably received within the slide-way slot 51, and are supported upon the spindle 22 at diametrically opposite positions relative thereto and on a line perpendicular to the line on which the guide rollers 43a and 43b are located. A driving roller 54, which is mounted upon a rotating member 55, is rotatably received within the slide-way slot 52. The rotating member 55 is rotatably journaled, by means of a needle bearing 56, within a cylindrical bore 22c of the spindle 22. Moreover, the rotating member 55 is provided with a key way 55b which is provided for engagement with a key 55a which is keyed to the right end portion of connecting member 31, to thereby allow an axial movement of the connecting member 31 relative to key way 55b. In addition, the driving roller 54 is located on a line which is perpendicular to the line on which the guide rollers 53a and 53b are located.

Figure 4:
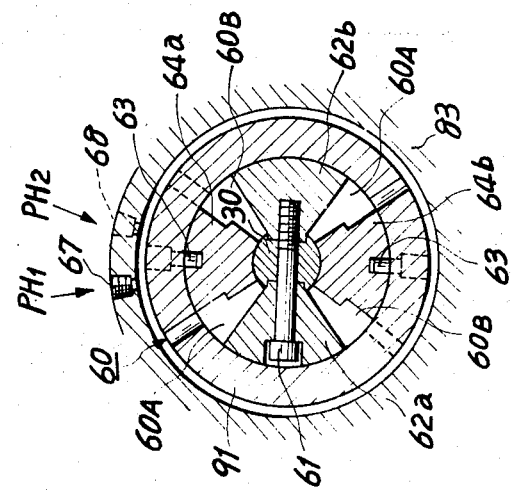
FIG. 4 is an enlarged cross-sectional view taken along the line IV—IV in FIG. 1.

The driving device A is composed of a rotating cylinder 60 and a reciprocating cylinder 70, the rotating cylinder 60 being rotatably mounted within the interior of the cylinder 70 which comprises a cylindrical housing portion 91 having associated therewith an integrally formed pulley 90 at one end thereof. The rotating cylinder 60 has rotatable pistons 62a and 62b, as shown in FIG. 4, which are secured to the primary operating shaft 30 by means of bolts 61, and partitions 64a and 64b therebetween, which are respectively mounted upon end pistons 71a and 71b by means of bolts 66a and 66b, as shown in FIG. 1. Into pressure chambers 60A and 60B, which are located between the rotatable pistons 62a and 62b and the partitions 64a and 64b, (see FIG. 4) is introduced fluid under pressure through appropriate hydraulic circuitry, as described hereinafter. When fluid under pressure is supplied to the pressure chambers 60A and 60B, the primary operating shaft 30 is rotated by means of the rotational movement of the pistons 62a and 62b by the pressure differential created therebetween, due to the existence of an unbalanced condition in the grinding wheel 1. The pulley 90 is rotatably mounted within a housing 83 secured upon the wheel head 2 through means of ball bearings 81 and 82, and is also keyed to the left end portion of the spindle 22 by means of a semi-circular key 92. The reciprocating cylinder 70 is provided with the pistons 71a and 71b which are respectively fixed to the partitions 64b and 64a by means of the bolts 66a and 66b, and is slidably received within the cylinder housing portion 91. A right chamber 70A and a left chamber 70B associated with the cylinder 70 are arranged for axially moving the primary operating shaft 30 by means of the fluctuation in pressure detected by a vibration detector, as will be more fully described hereinafter.

That is, the axial movement of the rod 30 is effected by the reciprocal movement of the pistons 71a and 71b caused by the difference in pressure created between the right and left chambers 70A and 70B, due to an unbalanced condition in the wheel 1.

Figure 5:
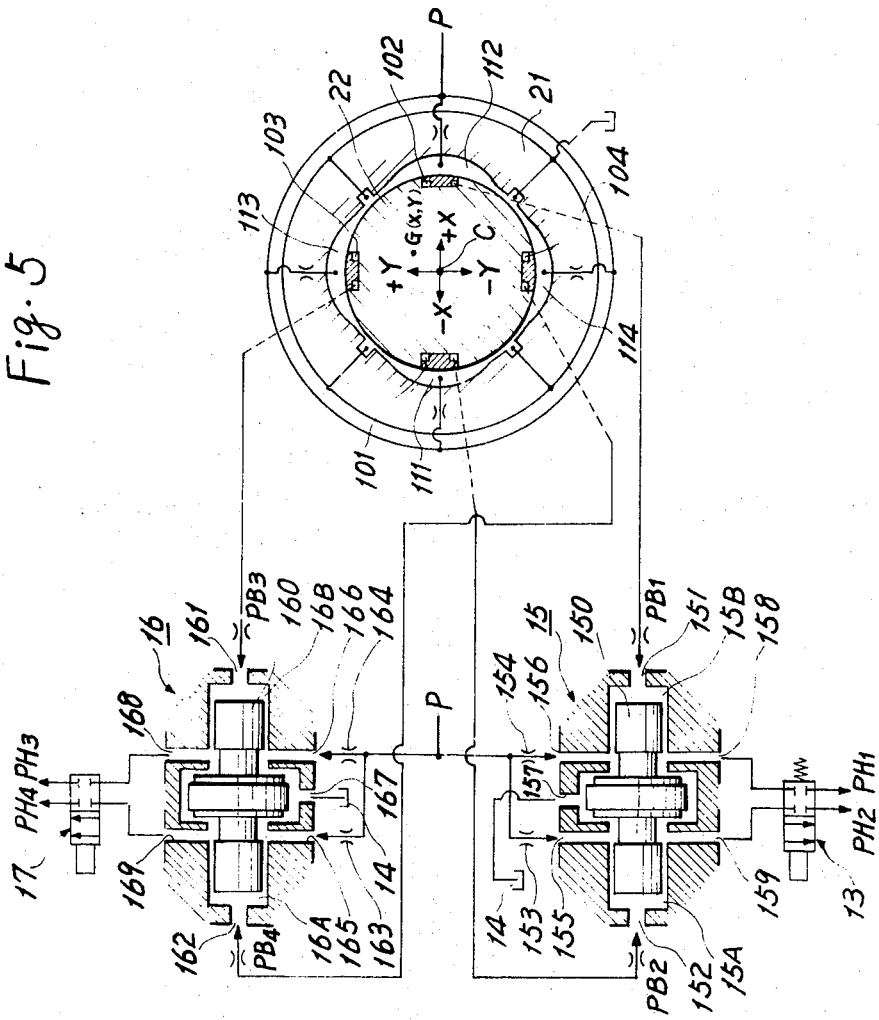
FIG. 5 is a schematic cross-sectional view taken along the line V—V of FIG. 2 diagrammatically showing the relationship with a hydraulic circuit for detecting vibration.

The vibration detector for detecting vibration of the spindle 22 due to the unbalanced condition of the grinding wheel 1 will now be described. As shown in FIG. 5, detective pressure passages 101 and 102 are provided at diametrically opposite positions upon an X-axis of the spindle 22. Detective pressure passages 103 and 104 are likewise formed at diametrically opposed positions upon the periphery of the spindle 22 and upon a Y-axis thereof. Upon the inner surface of bearing sleeve 21, there are provided bearing pockets 111, 112, 113 and 114 which are connected with one another through restricted circumferential passways, each pocket being located 90° from the adjoining pockets.

Thus, fluid under pressure supplied to the fluid bearing, which is constructed by means of the bearing sleeve 21 and the spindle 22, is circulated through the bearing pockets 111–114 into a reservoir 14. The detective pressure passages 101–104 are respectively connected to ports 152, 151, 161, and 162 of amplifier valves, generally indicated by the reference characters 15 and 16 through detective pressure ports 101p, 102p, 103p and 104p attached thereto (see FIG. 2). The amplifier valve 15 is provided with admission ports 155 and 156 connected to a hydraulic power source P through throttle valves 153 and 154, respectively. Similarly, the amplifier valve 16 is provided with admission ports 165 and 166 which are connected to the power source P through throttle valves 163 and 164, respectively. Furthermore, spool valves 150 and 160 are slidably mounted within the respective valves 15 and 16 for controlling the exhaust of fluid from the respective outlet ports 157 and 167 to the reservoir 14 by a slidable movement thereof in response to the difference in the respective outlet hydraulic pressures $PB_1$, and $PB_2$, and $PB_3$ and $PB_4$. Outlet ports 158 and 159 of the amplifier valve 15 are respectively connected to ports 67 and 68 of the rotating cylinder 60 through a solenoid valve 13. Similarly, outlet ports 168 and 169 of the amplifier valve 16 are respectively connected to ports 77 and 78 of the reciprocating cylinder 70 through a solenoid valve 17.

The operation of the automatic balancing apparatus for a rotating body, according to this invention, will now be described. When the gravitational center of the spindle 22 and its associated parts is in a position which deviates from the physical center of the spindle and has a locus whose X, Y coordinates place it in the first positive quadrant, as shown in FIG. 5, the spindle 22 will rotate about the gravitational center, and therefore, the detective hydraulic passage 102 will tend to approach the bearing sleeve 21 at a distance which is smaller than that of the detective hydraulic passage 101, relative to sleeve 21. Similarly, the detective hydraulic passage 103 will also approach the sleeve 21 within a distance which is small when compared with the distance between the detective hydraulic passage 104 and sleeve 21. In this state, the pressures at the detective hydraulic passages 102 and 103 are increased in comparison with those of the passages 101 and 104. As the passages 101 and 102 are operatively associated with cylindrical inlet chambers 15A and 15B of the amplifier valve 15 through respective ports 152 and 151, the spool valve 150 is slidably moved toward the left from the position shown in FIG. 2. The output pressures $PH_1$ and $PH_2$ which are therefore amplified in a linear proportional relationship to the input pressures $PB_1$ and $PB_2$ are then obtained at the output ports 158 and 159.

In the same way, the passages 103 and 104 are respectively connected to cylindrical inlet chamber 16B and 16A of the amplifier valve 16 through the ports 161 and 162. Consequently, the spool valve 160 is moved toward the left, in FIG. 5, and the output pressures $PH_3$ and $PH_4$ of the amplifier valve 16 are amplified in a linear proportional relationship to the inlet pressures $PB_3$ and $PB_4$.

When the solenoid valves 13 and 17 respectively attached to the amplifier valves 15 and 16, are switched to move toward the right, the output pressures $PH_1$ and $PH_2$ are respectively applied to the pressure chambers 60A and 60B of the rotating cylinder 60, in FIG. 4. Furthermore, the output pressures $PH_3$ and $PH_4$ are respectively applied to the cylinder chambers 70A and 70B of the reciprocating cylinder 70, in FIG. 1. Therefore, the rotatable pistons 62a and 62b are rotated within the rotating cylinder 60 in a clockwise direction, since the output pressure $PH_2$ is, in this case, higher than the output pressure $PH_1$. At the same time, the pistons 71a and 71b are moved toward the right within the cylinder 70, in FIG. 1, due to the difference in pressure generated between the right and left chambers thereof, namely because pressure $PH_4$ is greater than pressure $PH_3$.

Accordingly, the primary and secondary operating shafts 30 and 33 are shifted toward the right and thus the rotating member 45, and the driving roller 44 are turned in a clockwise direction, in FIG. 3, within the spindle 22, whereby the balancing piece 40 is radially lowered along the guide rollers 43a and 43b to partly compensate for the positional deviation in the gravitational center of spindle 22 and its associated parts.

Similarly, the second balancing piece 50 is radially moved toward the left, in FIG. 3, along the guide rollers 53a and 53b, to partly compensate for the positional deviation in the center of gravity, through the connecting member 31, the key 55a, the rotating member 55 and the driving roller 54, in FIG. 1, because of rotation of the rod 30 in a clockwise direction.

Through the process described above, compensation for the unbalanced condition of the grinding wheel or the eccentric location of the center of gravity of the spindle is automatically accomplished. Thereafter, the operation of the rotating cylinder 60 and the reciprocating cylinder 70 is stopped and the solenoid valves 13 and 17 are additionally de-energized when performing the grinding operation upon the workpiece.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by Letters Patent of the United States is:

1. An automatic balancing apparatus for a rotating body comprising:
a spindle provided for mounting said rotating body;
a fluid bearing arranged to rotatably support said spindle;
a pair of balancing pieces mounted within said spindle and movable at right angles with respect to each other;
operating shaft means operably connected to said balancing pieces and axially and rotatably movable within said spindle for adjusting the position of said balancing pieces;
a vibration detector associated with said fluid bearing for detecting vibration of said spindle as a function of a pressure differential; and
driving means operable in response to said pressure differential for imparting axial and rotational movements to said operating shaft means to compensate for the unbalance existing within the rotating body.

2. An automatic balancing apparatus as set forth in claim 1, wherein said operating shaft means comprises:
a primary operating shaft slidably and rotatably disposed along the axis of said spindle;
connecting means secured to one end of said primary operating shaft and slidably mounted within said spindle;
a secondary operating shaft rotatably received within said connecting means and co-axially arranged with said primary operating shaft, said secondary operating shaft being provided with a peripheral helical groove;
a first rotating means, having guide means which is in engagement with said helical groove, capable of radially moving one of said balancing pieces with respect to said spindle; and
a second rotating means operably connected to said connecting means for radially moving the other one of said balancing pieces with respect to said spindle.

3. An automatic balancing apparatus as set forth in claim 2, wherein said balancing pieces comprise:
a first balancing piece, formed with slide-way slots which intersect each other at right angles and which receive guide rollers mounted upon said spindle, and a driving roller, mounted upon said first rotating means, to be moved in a radial direction by a slidable movement of said secondary operating shaft; and
a second balancing piece, formed with slide-way slots which intersect each other at right angles and receive guide rollers mounted upon said spindle, and a driving roller, mounted upon said second rotating means, to be moved in a radial direction by rotational movement of said primary operating shaft.

4. An automatic balancing apparatus as set forth in claim 1, wherein said vibration detector comprises:
two pairs of detective means, provided respectively at diametrically opposite positions upon the outer periphery of said spindle, for detecting said pressure differential, due to the unbalanced condition of said rotating body; and amplifier valves respectively communicating with said detective means for amplifying the pressure differential and for transmitting the amplified pressure differential to said driving means.

5. An automatic balancing apparatus as set forth in claim 4, wherein each of said amplifier valves comprises:
a cylindrical chamber; and
a spool valve slidably mounted within said cylindrical chamber for controlling the flow of pressurized fluid which is supplied to said driving means in accordance with said pressure differential detected by said detective means.

6. An automatic balancing apparatus as set forth in claim 1, wherein said driving means comprises:
a cylindrical housing having a cylindrical chamber;
reciprocatable pistons slidably carried within said cylindrical chamber and secured to said primary operating shaft for axially moving said primary shaft in accordance with said pressure differential detected by said detective means;
a rotatable piston positioned between said reciprocatable pistons and secured to said primary operating shaft; and
partitions, secured between, and fixed upon said reciprocatable pistons so as to form pressure chambers with said rotatable piston, said partitions being non-rotatable with respect to said cylindrical housing, and wherein said rotatable piston is capable of rotating said primary operating shaft in accordance with said pressure differential which is applied to said pressure chambers.

* * * * *